(12) United States Patent
Shooster

(10) Patent No.: US 6,188,762 B1
(45) Date of Patent: Feb. 13, 2001

(54) WEB CALL CENTER/PSTN TO TCPIP INTERNET NETWORK

(76) Inventor: Stephen Shooster, 777 S. State Rd. 7, Margate, FL (US) 33068

( * ) Notice: Under 35 U.S.C. 154(b), the term of this patent shall be extended for 0 days.

(21) Appl. No.: 08/980,626

(22) Filed: Dec. 1, 1997

(51) Int. Cl.[7] .......................... H04M 3/523; H04L 12/66; H04Q 3/64
(52) U.S. Cl. .......................... 379/265; 370/352; 379/900
(58) Field of Search ................................... 370/352, 353, 370/354; 379/265, 266, 309, 127, 142, 900

(56) References Cited

U.S. PATENT DOCUMENTS 6,021,428 * 2/2000 Miloslavsky ..................... 709/206

* cited by examiner

Primary Examiner—Harry S. Hong
(74) Attorney, Agent, or Firm—Law Practice of Scott L. Lampert, PA

(57) ABSTRACT

A web call center system which provides automatic access to and retrieval of data from a remote or local web host by a call center operator upon receipt of a telephone call. The web call center includes a switch (PBX), a computer workstation, a telephone, a data link, a network server, computer/telephony integration (CTI) software, a network router, and application software to process the DNIS data and access the corresponding local application or web site data. In use, a call is received by the call center PBX, which routes the voice component to a telephone at a particular workstation location and the DNIS, ANI and Destination DN components, through its data link, to an external data link which, in turn, passes them to the network server wherein CTI software resides. The CTI software correlates the particular telephone to which the voice component of the telephone call was sent with the particular workstation where that telephone is located and sends the relevant DNIS, ANI and Destination DN components to that workstation. The DNIS component is processed, causing either a local application screen, with data residing on a local server or remote server, or a particular web site, with data residing on a local or remote web host, to "pop" (i.e., be automatically displayed) on the workstation screen.

14 Claims, 1 Drawing Sheet

WEB CALL CENTER/PSTN TO TCPIP INTERNET NETWORK

BACKGROUND OF THE INVENTION

1. Field of the Invention

The present invention relates to telecommunications systems and, more particularly, to a system which provides a call center operator with automated activation of and access to an internet web site.

2. Description of the Related Art

A call center is a group of agents or automated voice response units that conduct customer contact functions, such as customer service, order entry, reservations, dispatch, telemarketing and other common applications, over the telephone. The use of call centers today has become commonplace as many organizations now manage their customer contact functions via such call centers.

In addition to call centers, many organizations now maintain web sites on the internet for customers to access. Such web sites have become a common and, in many instances, a necessary marketing tool for businesses and organizations. Many of these web sites provide telephone numbers for the customer to call to get further information on the product or service being marketed. Currently, call centers which handle these calls must either maintain the organizations' data in their own computers, resulting in a duplication of data and increased costs to maintain such data, or manually access the organizations web site after a customer calls, resulting in longer time per call and, correspondingly, decreased productivity and customer satisfaction.

The effectiveness and productivity of call centers is scrutinized by organizations just as closely as other business functions. Call centers, like any other business function, must be cost effective if they are to be useful to an organization. In addition to their cost, call centers are closely scrutinized by organizations because of their inherent function as a customer contact tool. Call centers are often designed to serve as the main source of customer interaction and, consequently, their importance may be vital to the success of an organization. Thus, means to improve call center productivity and customer satisfaction are constantly being sought. These objectives are not mutually exclusive of each other and ultimately come down to shortening the length of the telephone calls. This can be achieved by instantly providing the relevant information, both from a local host computer or from a customer's computer via a web browser, on the call center operator's screen. Such instant access increases customer satisfaction by delivering prompt service and increases the number of calls handled by each operator, thereby enabling the call center to employ less operators or provide additional services with the same number of operators.

The current state of the art is such that the call center operator receives or places a telephone call through the Public Switched Telephone Network (PSTN) and inputs and retrieves data relevant to the particular call via a computer workstation. Specifically, in a typical call center, a telephone number is dialed by a customer from a remote location and routed to the call center through the PSTN. The telephone call, and its associated dialed number identification service (DNIS), auto number identification (ANI) and destination directory number (Destination DN) components, is received by the call center switch or Public Branch Exchange (PBX) which, in turn, splits the call into a voice component, which is routed to a telephone at a particular workstation location, and a data component, which is routed to a server which houses computer/telephony integration (CTI) software. The CTI software processes the DNIS, ANI and Destination DN data causing the data relevant to the particular call to "pop" (i.e., be automatically displayed) on the workstation screen. Thus, the call center operator will have the relevant data on his or her computer workstation screen at the start of his or her conversation with the customer. Some data, such as the DNIS, ANI or other call related data, may also be routed to the telephone and visually displayed for the operator.

Although the prior art call centers are useful for their intended purposes, none has proven to be entirely effective. Specifically, in the typical prior art call center environment, the data which pops on the workstation screen resides in a local host computer or server. However, such an arrangement has several deficiencies. First, call centers often provide customer contact functions for several different organizations. Thus, the call centers must load, maintain and service the organizations' data in their local host computer or server. This may require an extensive infrastructure and tremendous resources to maintain, service and update the data. Second, organizations are increasingly marketing their products or services over the internet, in addition to utilizing call centers to handle the direct customer contact. Thus, these organizations must either maintain two sets of data, one on the web host and one on the call center's local host computer or server, or the call center operator must manually access the web host after receiving the telephone call from the customer. Both of these scenarios have their own inherent deficiencies, which decrease productivity and increase costs. For instance, maintaining two sets of data requires both the organization and the call center to maintain computer equipment and the data therein, whereas requiring the call center operator to manually access the remote web host after receiving the telephone call from the customer increases the time required to serve the customer, thereby decreasing the number of calls handled by the operator each day, as well as decreasing customer satisfaction. Although a call center may access an organization's remote data through a private network, the number of private terminal emulation packages that may be displayed on the call center's workstation screens and, consequently, the number of different private network remote applications that may be handled, is limited.

Accordingly, there is still a need in the art for a call center which provides automatic access to and retrieval of data from both a local call center computer or server and a local or remote web host by a call center operator. Any such device should result in the relevant local application or web site automatically "popping" (i.e., automatically being displayed) on the operator's screen upon receipt of the telephone call. The present invention is particularly suited to overcome those problems which remain in the art in a manner not previously known.

SUMMARY OF THE INVENTION

The present invention is directed towards a new and improved call center which provides automatic access to and retrieval of data from a remote or local web host by a call center operator upon receipt of a telephone call. The web call center includes a switch or public branch exchange (PBX), a computer workstation, a telephone, a data link, a network server, computer/telephony integration (CTI) software, a network router, and application software to process the DNIS data and access the corresponding local or web site data. In use, a call is received by the call center PBX where it is split into a voice component, which is routed to a telephone at a particular workstation location, and specific DNIS, ANI and Destination DN components related to the originating telephone number and the telephone number dialed. The PBX passes the DNIS, ANI and Destination DN components through its data link to an external data link which, in turn, passes them to the network server wherein the CTI software resides. The CTI software correlates the particular telephone to which the voice component of the telephone call was sent with the particular workstation where that telephone is located and sends the relevant DNIS, ANI and Destination DN components to that workstation. The DNIS component corresponds to data in a look-up table, which resides either in the workstation or a local mainframe or server, and determines whether a local application, or a particular web site with data residing on a local or remote web host, pops on the workstation screen. If the DNIS component corresponds to a particular web site, the application software passes the corresponding URL contained in the look up table to a web browser, which, in turn, navigates the web, through a local area network (LAN) to a local web host, or a communication/router device, such as a network router, ISDN modem or other similar device, and the PSTN to a remote web host, causing the particular web site to pop on the workstation screen.

It is an object of the present invention to provide a new and improved call center which has all the advantages of the prior art cover devices and none of the disadvantages.

It is also an object of the present invention to provide a call center which provides automatic access to a remote or local web host.

It is another object of the present invention to provide a call center which can automatically retrieve data from a remote or local web host.

It is a further object of the present invention to provide a call center in which data from a local server or computer or from a web site automatically pops on the operators screen upon receipt of the telephone call.

These and other objects and advantages of the present invention will become more readily apparent in the description which follows.

BRIEF DESCRIPTION OF THE DRAWINGS

For a fuller understanding of the nature of the present invention, reference should be had to the following detailed description, taken in connection with the accompanying drawings in which.

Like reference numerals refer to like parts throughout the several views of the drawings.

DETAILED DESCRIPTION OF THE PREFERRED EMBODIMENT

Figure 1:
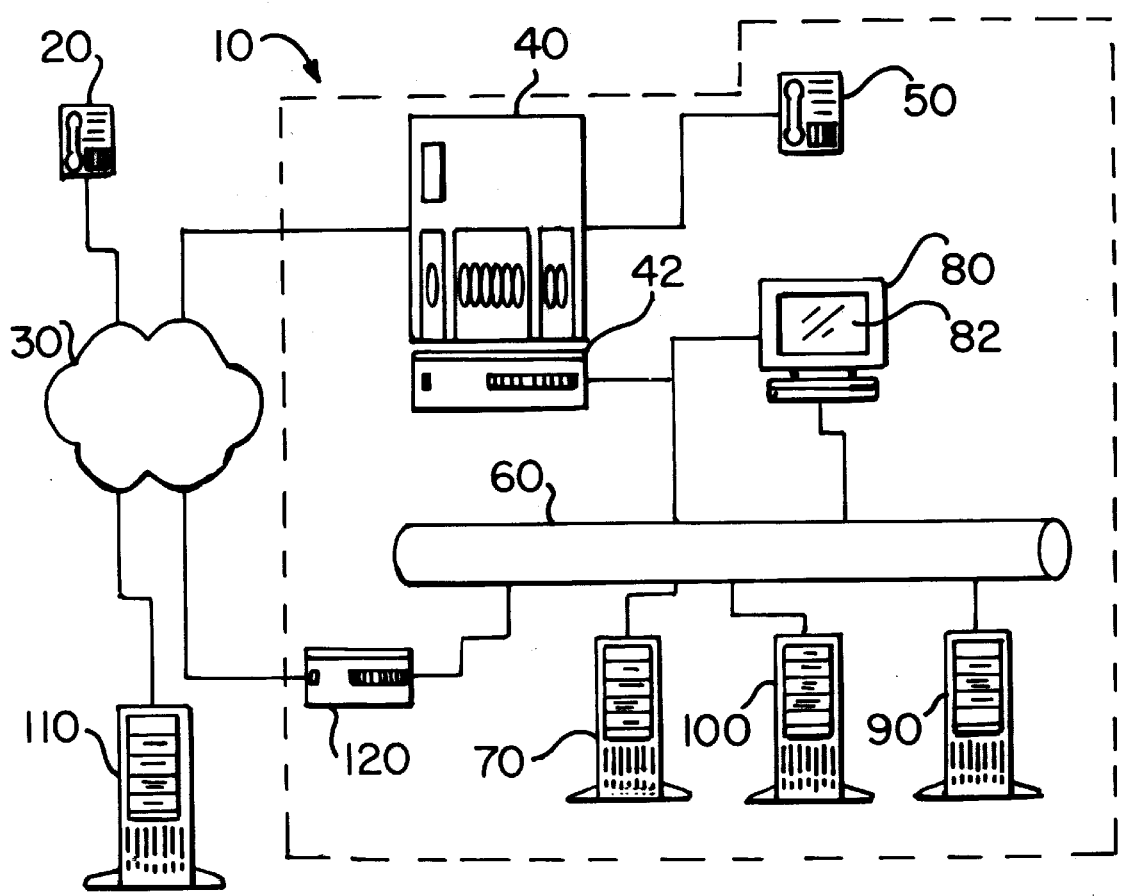
FIG. 1 is a block diagram of the system of the present invention.

As shown in FIG. 1, the present invention is directed towards a new and improved call center 10 which provides automatic access to and retrieval of data from a remote or local web host by a call center operator upon receipt of a telephone call. In the web call center 10 of the present invention, a call is placed from a standard telephone 20 and routed through the PSTN 30 to the call center 10, where it is received by the call center PBX 40. The PBX 40 is of the general type manufactured by Nortel, such as the Nortel Meridian 1, but may also be of another similar Computer Telephone Integrated System manufactured by AT&T, Rockwell or the like. The call is typically received by the PBX 40 in either TIE, integrated systems digital network (ISDN), direct inward dial (DID) or ear and mouth (E&M) formats, but is not limited to these particular formats.

The PBX 40 splits the call into a voice component, which is routed to a telephone 50 at a particular workstation location, and specific DNIS, ANI and Destination DN components related to the originating telephone number and the telephone number dialed. Some data, such as the ANI or other call related data, may also be routed to the telephone 50 and visually displayed for the call center operator.

The PBX 40 passes the DNIS, ANI and Destination DN components through its data link 42 (the Meridian Link in the Nortel Meridian 1 system) to an external data link 60 which, in turn, passes them to a server 70 or other computer wherein CTI software resides. The network protocol supported on the data link 60 is preferably transport control protocol/internet protocol (TCP/IP), but may be any other compatible protocol.

The CTI software combines telephone and computer technology to enable voice and data processing equipment to work together by creating applications that monitor and control telephone calls. The CTI software is preferably CT-Connect, but may be any other similar CTI software. The CTI software isolates the PBX 40 from the operator workstation 80 and manages the flow of data therebetween. Specifically, the CTI software correlates the particular telephone 50 to which the voice component of the telephone call was sent with the particular workstation 80 where that telephone 50 is located and sends the relevant DNIS, ANI and Destination DN components to that workstation 80.

The CTI software comprises server software, which resides on a network server 70, and application/client software or Active X control software, which resides on each workstation 80. The server software receives telephony requests from the workstations 80, converts these requests to a protocol compatible with the PBX 40 and then forwards them to the PBX 40, which, in turn, returns the results to the appropriate workstation 80 via the network server 70. The application/client software or Active X control software provides an interface between the network server 70 running the CTI applications and the database mapping table used to determine which application or web site to present to the call center operator. Alternatively, the Active X control may reside on a network server 70 or other computer (not shown).

The DNIS component corresponds to data in a look-up table, which resides either in the workstation 80 or a local mainframe or server 90, and determines whether a local application or a particular web site with data residing on a local 100 or remote 110 web host, pops on the workstation 80 screen 82. If the DNIS component corresponds to a particular web site, the CTI software passes the corresponding URL contained in the look up table to a web browser, which, in turn, navigates the web, through a local area network (LAN) to a local web host 100, or a communication/router device 120, such as a network router, ISDN modem or other similar device, and the PSTN 30 to a remote public or private web host 110, causing the particular web site to pop on the workstation 80 screen 82. Specific queries or parameters may be appended to the URLs in the look up table, as appropriate, and passed, via the web browser, to the web site causing specific information relevant to the telephone number dialed by the customer, rather than just the web site home page or other general information, to pop on the workstation 80 screen 82. These specific queries prevent the call center operator from having to scroll through various web pages or enter certain general information related to the customer or the relevant product or service, thereby minimizing the length of the telephone call and increasing the call center 10 and operator productivity.

Various changes may be made within the spirit and scope of the invention as described above.

What is claimed is:

1. A web call center system for integrating a telephone call center communication facility and a web site comprising:

a telephone switch for receiving and transmitting a plurality of telephone calls;

at least one workstation having a computer processor, a display and a memory for storing a plurality of processor implemented computer instructions;

a network server;

computer/telephony integration software for monitoring and controlling said telephone calls and interpreting DNIS data associated with said telephone calls to determine whether to display a local application or a web site on said display and to cause said local application or said web site to be displayed on said display, said computer/telephony integration software including a server portion stored on said network server and an application portion stored on said workstations;

at least one telephone for audio communication between a workstation operator and a person at a remote location associated with said telephone call;

interface means for interfacing said switch, said workstations, said network server and said telephones; and communication means for interfacing said workstations with a web site as directed by said telephone call DNIS data so that said web site is retrieved from a web host and displayed on said display of said workstation operator handling said telephone call.

2. A web call center system for integrating a telephone call center communication facility and a web site as recited in claim 1 wherein said interface means includes a data link supporting transport control protocol/internet protocol (TCP/IP).

3. A web call center system for integrating a telephone call center communication facility and a web site as recited in claim 1 wherein said communication means includes a network router.

4. A web call center system for integrating a telephone call center communication facility and a web site as recited in claim 1 wherein said communication means includes a local area network.

5. A web call center system for integrating a telephone call center communication facility and a web site as recited in claim 1 wherein said communication means includes an ISDN modem.

6. A web call center system for integrating a telephone call center communication facility and a web site comprising:

a telephone switch for receiving and transmitting a plurality of telephone calls;

at least one workstation having a computer processor, a display and a memory for storing a plurality of processor implemented computer instructions;

a network server;

a mainframe computing system having a computer processor and a memory for storing a plurality of processor implemented computer instructions;

computer/telephony integration software for monitoring and controlling sad telephone calls and interpreting DNIS data associated with said telephone calls to determine whether to display a local application or a web site on said display and to cause said local application or said web site to be displayed on said display, said computer/telephony integration software including a server portion stored on said network server and an application portion stored on said mainframe computing system;

a telephone for audio communication between a workstation operator and a person at a remote location associated with said telephone call;

interface means for interfacing said switch, said workstations, said network server, said mainframe computing system and said telephones; and communication means for interfacing said workstations with a web site as directed by said telephone call DNIS data so that said web site is retrieved from a web host and displayed on said display of said workstation operator handling said telephone call.

7. A web call center system for integrating a telephone call center communication facility and a web site as recited in claim 6 wherein said interface means includes a data link supporting transport control protocol/internet protocol (TCP/IP).

8. A web call center system for integrating a telephone call center communication facility and a web site as recited in claim 6 wherein said communication means includes a network router.

9. A web call center system for integrating a telephone call center communication facility and a web site as recited in claim 6 wherein said communication means includes a local area network.

10. A web call center system for integrating a telephone call center communication facility and a web site as recited in claim 6 wherein said communication means includes an ISDN modem.

11. A web call center system for integrating a telephone call center communication facility and a web site comprising:

a telephone switch for receiving and transmitting a plurality of telephone calls;

at least one workstation having a computer processor, a display and a memory for storing a plurality of processor implemented computer instructions;

a network server;

a mainframe computing system having a computer processor and a memory for storing a plurality of processor implemented computer instructions;

computer/telephony integration software for monitoring and controlling telephone calls and interpreting DNIS data associated with said telephone calls to determine whether to display a local application or a web site on said display and to cause said local application or said web site to be displayed on said display, said computer/telephony integration software including a server portion stored on said network server and an application portion stored on said mainframe computing system;

a telephone for audio communication between a workstation operator and a person at a remote location associated with said telephone call;

a data link for interfacing said switch, said workstations and said telephones, said data link supporting transport control protocol/internet protocol (TCP/IP); and communication means for interfacing said workstation with a web site as directed by said telephone call DNIS data so that said web site is retrieved from a web host and displayed on said display of said workstation operator handling said telephone call.

12. A web call center system for integrating a telephone call center communication facility and a web site as recited in claim 11 wherein said communication means includes a network router.

13. A web call center system for integrating a telephone call center communication facility and a web site as recited in claim 11 wherein said communication means includes a local area network.

14. A web call center system for integrating a telephone call center communication facility and a web site as recited in claim 11 wherein said communication means includes an ISDN modem.

* * * * *